Patented Dec. 23, 1952

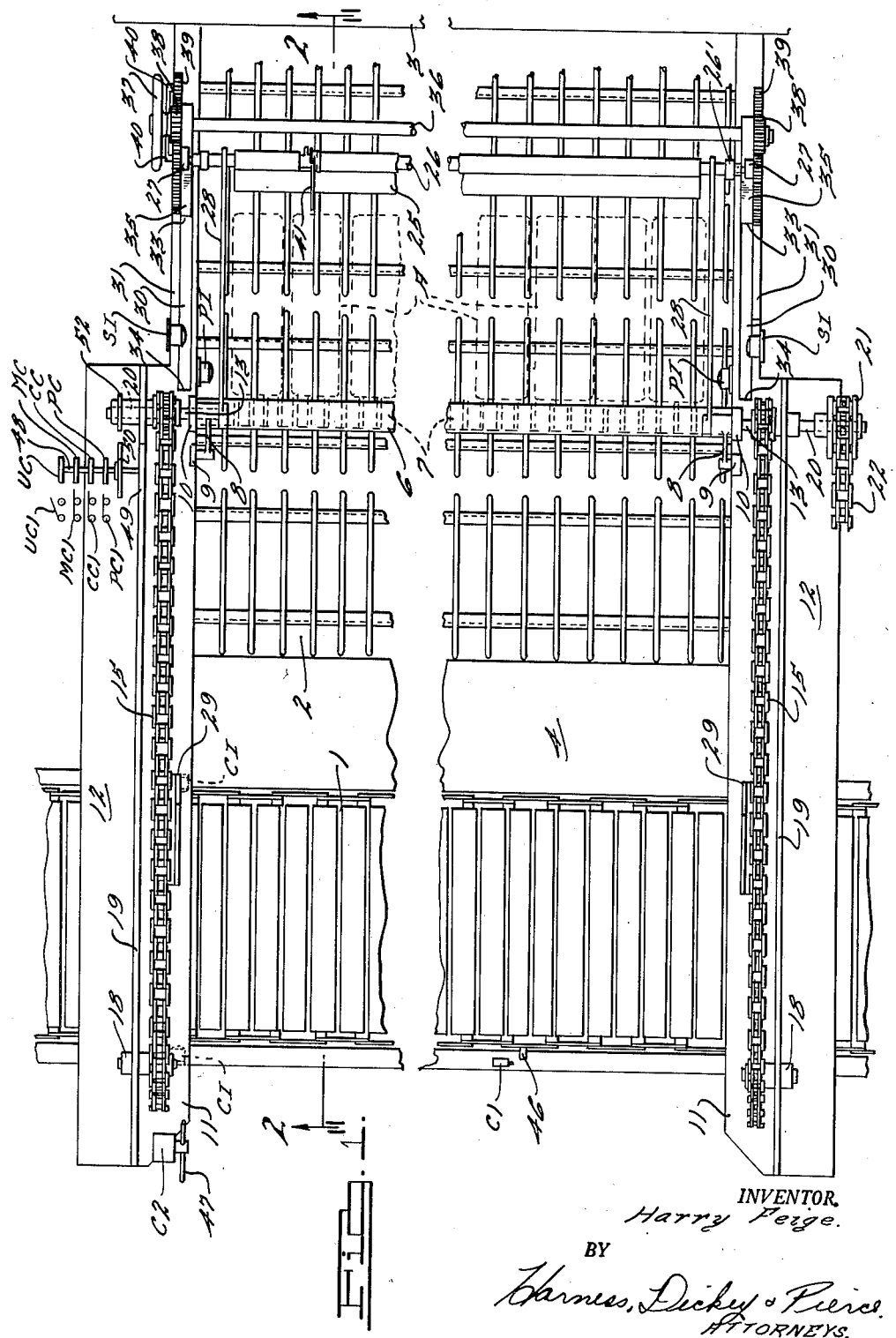

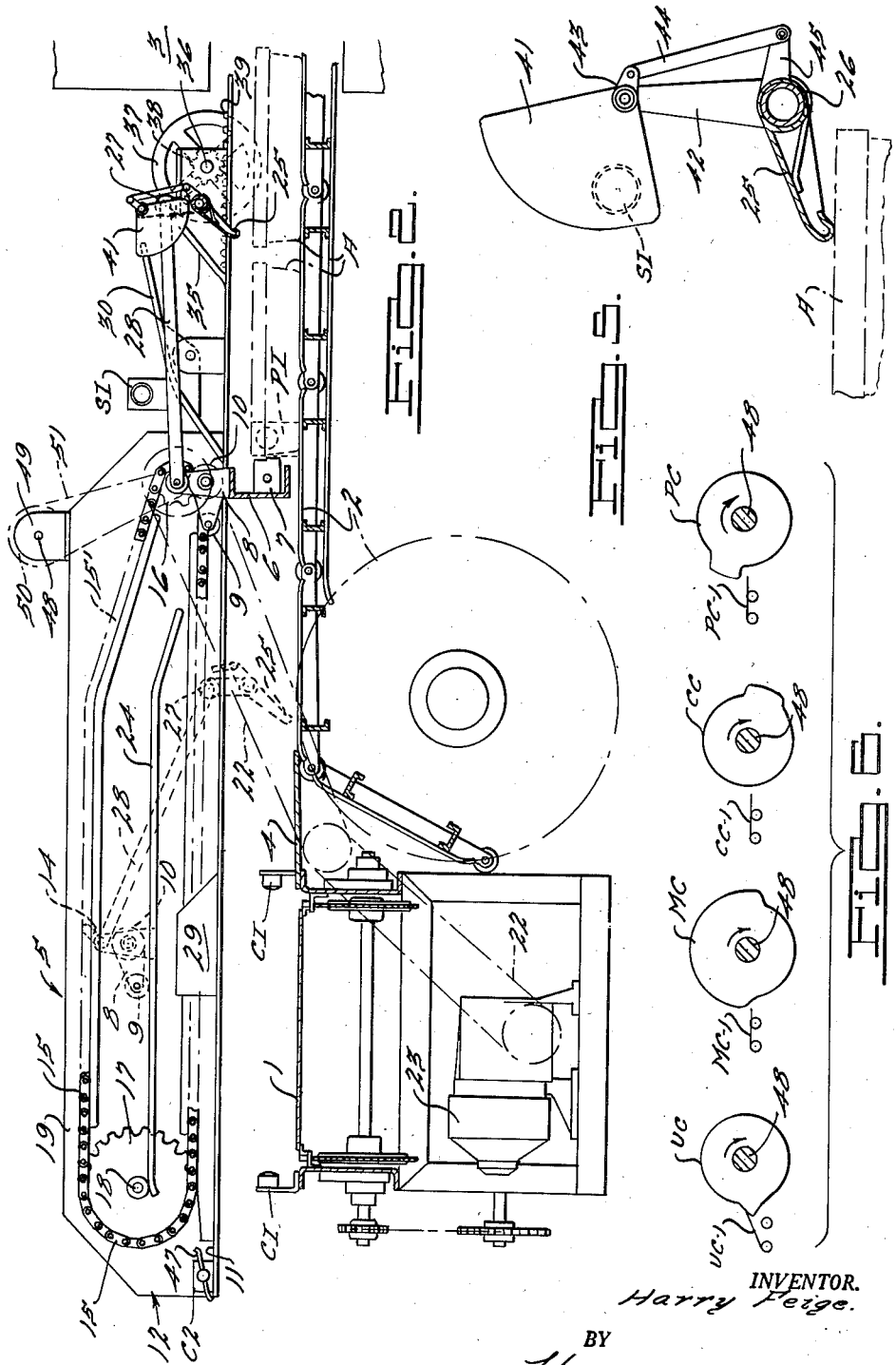

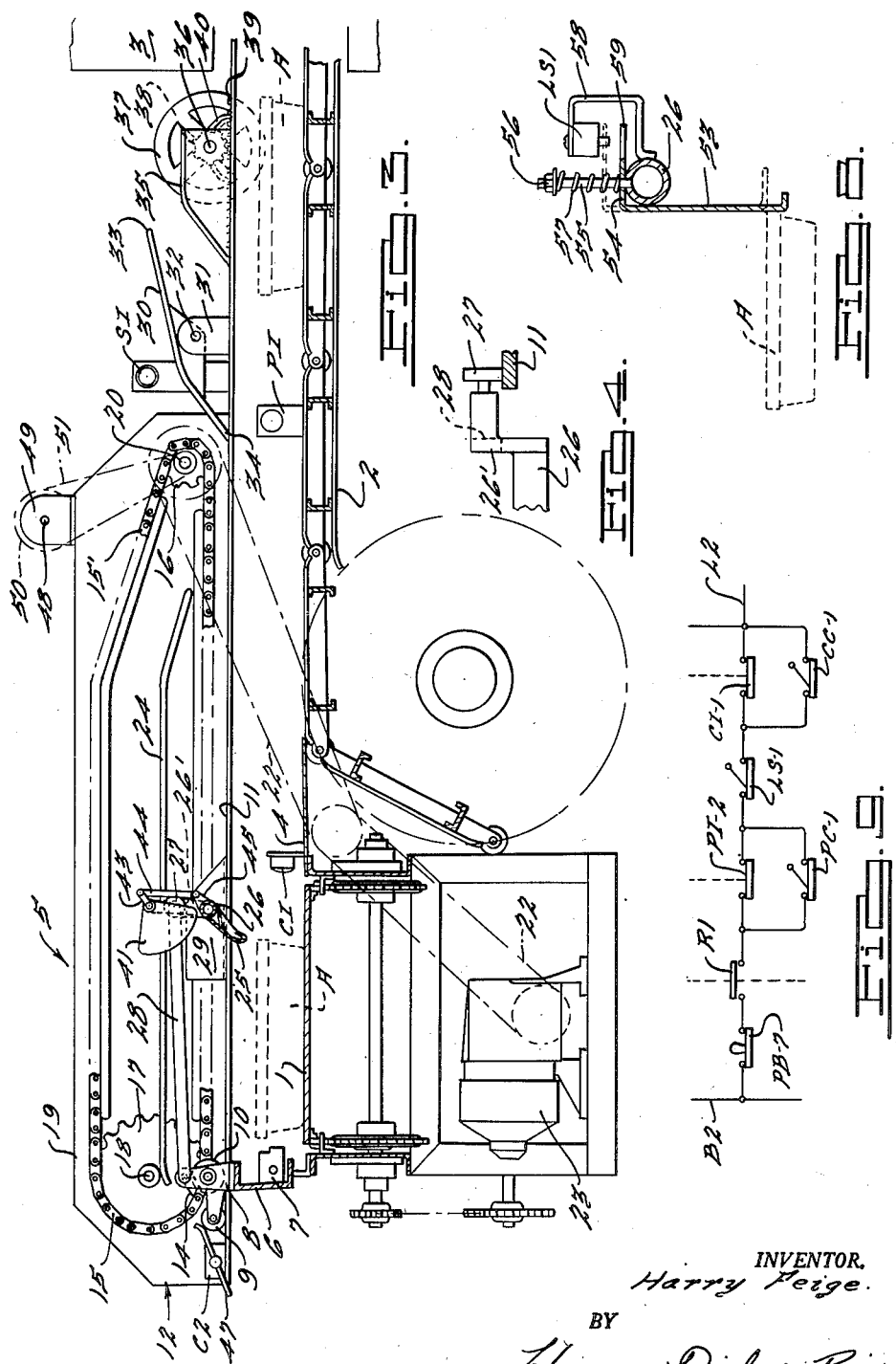

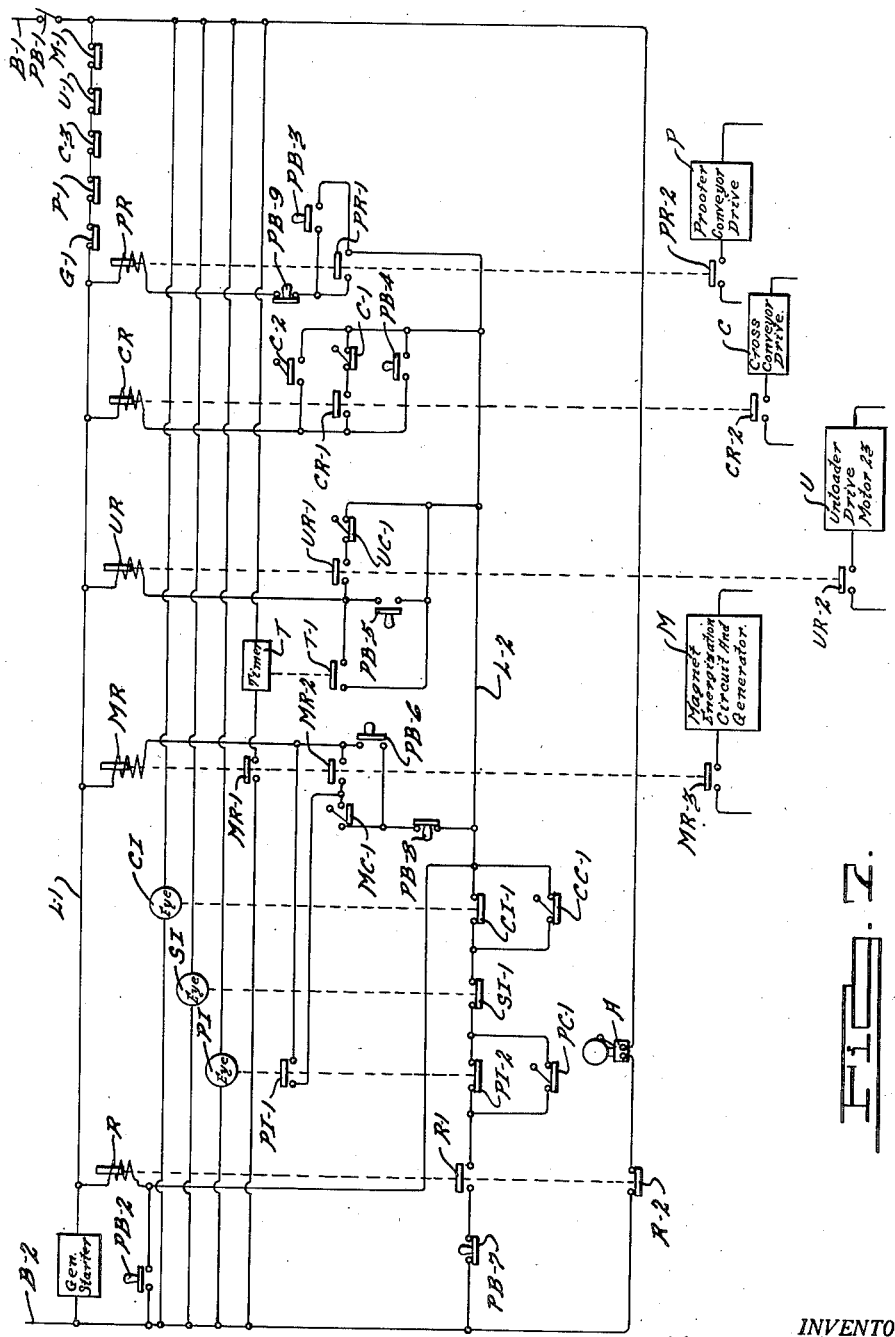

2,622,718

UNITED STATES PATENT OFFICE 2,622,718

ARTICLE TRANSFER FOR PROOFER UNLOADERS

Harry Feige, Saginaw, Mich., assignor to Baker Perkins, Inc., Saginaw, Mich., a corporation of New York Application October 22, 1948, Serial No. 55,995

10 Claims. (Cl. 198—32)

This invention relates to conveyor systems and, in particular, refers to automatic means for transferring articles from a point on a first conveyor to a second point.

In mass production industrial operations, the use of endless belt-type conveyors to provide a moving roadway for the transfer of articles from one point to another has become commonplace. It is often necessary in such operations to use more than one conveyor to carry a given article through its processing cycle. This may, for example, be necessary in order to obtain different rates of movement of the article as it passes through successive steps in the process or it may be required by a non-rectilinear arrangement of the processing apparatus which necessitates a change in the direction of movement of the article.

When two or more conveyors in the same horizontal plane are used to move articles, the problem is raised of how to transfer articles from one conveyor to the other since, as will be recognized, this cannot be achieved without the intervention of an outside agency. From the practical standpoint, this transfer is best accomplished by sliding art articles across a stationary roadway which may be provided between the moving roadways of the two adjacent conveyors. In many cases it is essential that the articles on the conveyors be handled with extreme care. For example, in the baking industry during the processing of bread dough any sudden forces or shocks to pans of dough being conveyed are likely to ruin the dough for bread making purposes. Hence, in cases such as this, it is a prime requirement that the transfer of articles from one conveyor to another across the stationary roadway occur smoothly and without agitaion or jarring.

It is thus the broad object of this invention to provide automatic means for carefully moving articles from one conveyor to another across a stationary roadway.

While the invention has many other applications, it is described herein in connection with the baking industry. In particular this invention is used in the automatic processing of bread dough to transfer pans of dough from a conveyor carrying them from a proofer to a conveyor for carrying the pans to an oven. In this connection it is an object of the invention to provide means for pushing the pans across the stationary roadway.

The invention is particularly adapted for use in applications in which the stationary roadway forms a rectilinear extension of the moving roadway which carries the articles to be transferred, and, with especial reference to such applications, it is a further object of the invention to provide means for at least separating the foremost articles on the moving roadway from those behind, and preferably for pulling the articles entirely across the stationary roadway, and means for positioning the pushing means behind such separated articles.

In automatic operations of the type mentioned, it occasionally happens that an article on one or the other of the conveyors is out of position so that it might cause a jam or damage to the moving mechanism. It is another object of the invention to provide automatic means for shutting down the apparatus in the event that an article becomes malpositioned, and thereby prevent such jams or damage to the equipment.

Other objects, as well as the novel features of construction whereby they are accomplished, will become apparent in the following description of the accompanying drawings, showing an embodiment of the invention as used to transfer pans from a proofer conveyor to a cross or oven conveyor, in which Figure 1 is a plan view of apparatus embodying the invention;

Fig. 2 is a vertical section taken along the line 2—2 of Fig. 1;

Fig. 3 is a section similar to that of Fig. 2 showing the moving or unloader mechanism in advanced position;

Fig. 4 is a view showing the manner in which the pusher is rotatably mounted on the frame;

Fig. 5 is an enlarged view with parts removed of the pusher bar and flag mechanism;

Fig. 6 is a view showing the cams in the position they occupy when the unloader mechanism is in the position of Fig. 2;

Fig. 7 is a line diagram of the control circuit for the apparatus;

Fig. 8 is a view of a modified form of pusher bar; and

Fig. 9 is a partial line diagram showing modifications in the circuit of Fig. 7 when the construction of Fig. 8 is employed.

Referring to the drawings, the invention is shown, by way of illustration and not of limitation, as applied to the transfer of dough pans A to the endless conveyor 1 from the endless conveyor 2 which carries them from the rear opening of proofer 3. The conveyors 1 and 2 are desirably of about the same height and may be oriented in any desired manner with respect to each other. In the embodiment shown they are arranged at right angles, hence the conveyor 1 may be referred to as a "cross" conveyor. The space between the conveyors 1 and 2 is spanned by a plate or apron 4 which forms, in effect, a stationary extension of the moving roadway provided by the conveyor 2.

According to the invention means are provided to separate the foremost row of pans A on conveyor 2 from those behind and preferably to move the dough pans A entirely across the plate 4. Magnetic forces are preferably employed for this purpose, hence, the pans A should be made of material which can be attracted to a magnet, such as mild steel. The pans may be moved individually or in any desired units, it being the practice in operating proofers to strap the pans together in groups of several abreast and one deep.

As best shown in Figs. 2 and 3, the moving mechanism 5 includes a transverse beam 6 which may, as shown, be a forwardly opening channel having a battery of electromagnets 7 suitably affixed to the web thereof so as to transversely span the conveyor 2. The beam 6 and magnets 7 are preferably arranged so that the latter may contact the leading edges of pans A emerging from the proofer 3 on the conveyor 2. The topside of each transverse end of the beam 6 may be affixed by welding or other suitable means to the under side of spaced carriages 8 which are desirably L-shaped. The lower or lateral legs of the carriages 8 are mounted on logitudinally spaced wheels 9 and 10 which ride on the inner horizontal edges 11 of the spaced longitudinal frame members 12. The upright legs of the carriages have outwardly extending pintles 13 (Fig. 1) rotatably secured thereto and these carry links 14 (Figs. 2 and 3) which are suitably attached to the sides of the endless chains 15. The links 14 are arranged to make the circuit with the chains 15 around and over the drive sprockets 16 and the idler sprockets 17. The idler sprockets 17 are carried by shafts 18 which are journaled in an upstanding web 19 of the frame members 12 and the drive sprockets 16 are carried by shafts 20 which are also journaled in the web 19. The drive sprockets 16 may be actuated by any suitable means such as power sprockets 21 rotatively connected to the shafts 20 and connected by means of chains 22 to a motor and speed reducer unit 23.

It will be recognized that by means of the structure so far described the magnet carrying beam 6 may be moved by the carriages 8 on the lower edges 11 of the frames 12 from the proofer 3 to the cross conveyor 1. It is this movement which is utilized to separate the dough pans A and to move them across the apron 4 by energizing the magnets 7 so that they are operatively connected to the pans A at the beginning of such movement (Fig. 2) and de-energizing them at the other end of the movement (Fig. 3) to leave them on the cross conveyor 1. After this, the carriages 8 and beam 6 reach the idler sprockets 17 and are raised above the pans A to the upper reach of the chains 15. In order to relieve the chains of the load of these parts, longitudinal tracks or guideways 24 are affixed to the inside of webs 19 of the frames 12. The tracks 24 are parallel to the upper reach of the chain and arranged so that the wheels 9 and 10 of the carriages 8 ride thereupon as indicated by the dash lines in Fig. 2.

While the foregoing structure is clearly capable of moving the dough pans A across the stationary roadway 4 in the desired manner, as a practical consideration it is desirable to provide additional moving means which is positive in its action and will drive any pans which are prematurely released by the magnets 7 on to the cross conveyor 1. For this purpose a transversely extending pusher bar 25 is provided which is adapted to engage the trailing edge of the pans A in order to push them to conveyor 1. The pusher bar 25 is secured to a transverse shaft 26, which for the sake of lightness is preferably hollow. This is secured to downwardly extending legs 26', which rotatably carry the wheels 27 that ride on the horizontal flange 11 of the frame member 12 outwardly of the carriage wheels 9 and 10, and are formed on the proofer ends of the longitudinal drag links 28. Drag links or arms 28 are pivotally connected to the vertical legs of the carriages 8 whereby movement of the carriages causes a corresponding movement of the shaft 26 and pusher bar 25. The arms 28 are of such length that the distance between the magnets 7 and the pusher bar 25 equals at least the length of the longest pan A or any unit which it is desired to move and preferably are somewhat longer than the distance between the shaft 26 and the upper reach of chain 15 so that the pusher bar will always remain on the proofer side of the magnet bar 6 for reasons which will become apparent hereinafter.

It is apparent from Figs. 2 and 3 that since the arms 28 are pivotally connected to both the carriages 8 and the wheels 27 and are of greater length than the diameter of the idler sprockets 17, the pusher bar will not make the circuit with chain 15 but will have only reciprocating motion along the lower flanges of the beam 12 and will always be between the magnets 7 and the proofer 3. It is necessary, however, to impart vertical movement to the pusher bar 25 so that it will be raised above the pans A at the proofer end of its path and it is sometimes desirable to raise it also at the cross conveyor end of its path. At the cross conveyor end of its path this may be accomplished, if desired, by means of upwardly inclined cam tracks 29 which are affixed to the frame members 12 outwardly of the edges 11 which are traveled by the carriage wheels 9 and 10 but in line with the pusher wheels 27. The tracks 29 begin at about the conveyor 1 end of the apron 4, so that, as shown in Fig. 3, the pusher bar 25 is lifted above the pans A shortly after it drives the pans onto the conveyor 1.

At the other end of its path the pusher bar 25 must be in elevated position as it moves toward the proofer 3 so as to pass over pans A emerging therefrom. Conflicting with this is the requirement that the bar 25 be in lowered position behind the pans A when it moves toward the conveyor 1. In order to impart these desired movements to the pusher bar 25, teeter cam tracks 30 for the pusher wheels 27 are provided which are pivoted at central sections to upstanding fulcrum brackets 31 as shown at 32. The pivot points 32 are so arranged that weight of the tracks 30 on the conveyor side thereof is the greater thus causing the unloaded tracks to assume the position of Figs. 2 and 3 wherein the proofer ends 33 of the tracks are raised and the conveyor 1 ends 34 engage the frame member 12 in the path of wheels 27. Obviously, this could be accomplished by spring means if desired. Beneath the ends 33 are elevated portions of upwardly inclined cam tracks 35. The tracks 35 are preferably slidably mounted on the frames 12 and rotatably support a transverse shaft 36 having a handwheel 37 and pinions 38 secured thereto, the latter engaging rack bars 39 on the frame members 12 adjacent the tracks 35. Dogs 40 may be connected to the shaft 36 and engageable with the racks 39 to lock the tracks 35 in the desired positions.

It will be recognized that when the pusher bar 25 moves toward the proofer 3 its wheels 27 will ride up the teeter tracks 30 so that its bottom edge is above pans A which have emerged from the proofer. When it has moved somewhat beyond the pivot point 32, the tracks 30 will tip and engage an elevated portion of the tracks 35 so that the pusher wheels 27 will ride thereupon. With the load removed, the teeter tracks 30 will pivot back to their positions of Figs. 2 and 3 so that when the pusher bar is subsequently moved away from the proofer 3, the wheels 27 will ride down the tracks 35 beneath the ends 33 of the teeter tracks. When the wheels 27 contact the underside of the end 34 of the teeter tracks 30, the latter will pivot upwardly about points 32 to permit passage thereby of the pusher bar assembly towards the conveyor 1. By longitudinally positioning the tracks 35 through the medium of handwheel 37, the lag between the starting movement of the magnets 7 and the operative positioning or lowering of the pusher bar 25 behind the pans A may be controlled. This lag is inversely related to the distance between the tracks 35 and the terminal position of the magnets 7. By varying it, various pan lengths and various spacings between successive pan units can be accommodated. When, as here, the electromagnets are employed not only for separating the pans A but also for pulling them from one conveyor to the other, it is desirable that the pusher bar 25 be lowered just ahead of the leading edge of the pan units following those being moved to conveyor 1.

The manner in which the foregoing structure operates is evident from the description and drawings. Under normal circumstances, the proofer conveyor 2 is continuously operated to remove pans from the proofer exit and the cross conveyor intermittently operated to receive pans from conveyor 2 via the apron 4 and move them toward a desired destination, in this case, an oven. When the magnet bar 6 is in its proofer most position, as shown in Figs. 1 and 2 in heavy lines, the magnets 7 engage the leading edges of the pans A and the pusher bar 25 is raised above the pans by means of the elevator cam tracks 35. When the chains 15 are actuated, the attached carriages 8 are moved toward the cross conveyor 1 carrying with them the depending bar 6 and the spaced pusher bar 25 which is connected to the carriages through the medium of the drag links 28. As the pusher bar 25 moves, its wheels 27 ride down the tracks 35 and beneath the upraised end 33 of the teeter cams 30 and raise the ends 34 thereof to pass underneath. The bar 25 falls behind the trailing edge of the pans A so that any that are not attracted to the magnets 7 will be pushed across the apron 4 onto the conveyor 1. When the pusher bar 25 has advanced a sufficient amount to insure deposition of the pans on the conveyor 1, the wheels 27 thereof ride up the incline of the elevated cam track 29. This raises the pusher bar 25 so that the bottom thereof clears the pans A. The carriages 8 and depending magnet bar 6 are carried by the chain 15 around the sprocket 17 and commence the return portion of the cycle to pick up another group of pans A. During this movement, the wheels of the carriage 8 travel on the track 24. Due to the spaced pivotal connection between the carriage 8 and the pusher wheels 27, however, the latter do not leave the track 11 but are pushed ahead of the carriage back toward the proofer. The wheels 27 of the pusher bar 25 ride up the teeter cams 30 so that the bar 25 clears the tops of pans A on the proofer conveyor 2. When they overbalance the weighted ends 34 of the teeter cams, the latter tilts to deposit the wheels 27 on the elevated tracks 35. In the meantime, the carriage 8 and bar 6 continue to approach the leading edges of the pans A and, if desired, the upper reaches of the chain 15 may be inclined as shown at 15' so that the bar approaches the pan A with more of a longitudinal than vertical component of motion such as would be obtained with large sprocket wheels 16. When the carriage 8 has passed around the sprocket 16 so that its wheels again engage the track 11, the unloader mechanism 5 has completed the cycle and is ready to move another set of pans A to the conveyor 1.

The unloader mechanisms, as well as the conveyors 1 and 2, heretofore described, are automatically operated by means to be described hereinafter. It is therefore desirable that controls be provided which are responsive to the positions of the pans A on the proofer conveyor 2 and the cross conveyor 1. For this purpose a pair of photoelectric cells PI are arranged to project a beam across the proofer conveyor 2 in the path of pans traveling thereon. As will become apparent hereinafter, the exact longitudinal position of the eyes PI is dependent upon a number of considerations, but as a general rule, it is desirable that they be arranged to project a beam just on the proofer side of the electromagnet battery 7 when the latter is in the position of Fig. 2 wherein it is a minimum distance from the proofer 3 and ready to commence movement toward the conveyor 1. A pair of photoelectric eyes CI are arranged to project a beam across the cross conveyor 1 in the path of pans traveling thereon. These cells are positioned so that the beam is intercepted by pans on conveyor 1 which have not cleared the proofer conveyor 2. The proofer eyes PI and the conveyor eyes CI include relay devices (not shown) which are operable upon breaking of the light beam, these assemblies of eyes and relays being conventional and well known to those in the art.

A third pair of photoelectric cells SI is provided as a safety device to break the operating circuit in the event that the pusher bar 25 falls on top of a pan A instead of to the rear and behind the pan. The safety eyes SI also include relay devices (not shown) which are operable upon breaking of the beam. The eyes are positioned above and on the proofer side of the proofer eyes PI and the beam they provide is broken by a flag 41 (Fig. 4), connected to pusher bar 25, in the event the bar rests on top of a pan A. The flag 41 is pivotally mounted on an upright support 42 which is secured to the shaft 26 (Fig. 1). A crank arm 43 is affixed to the flag 41 and a link 44 is pivotally connected to the crank 43 and to a second crank 45 which is secured to the pusher bar 25. It will be apparent that these connections transmit upward movement of the pusher bar 25 into raising of the flag 41 so that it will cut the beam projected by safety eyes SI. In normal operation the pusher bar 25 will be in a lowered position, such as shown in Figs. 1 and 2, and the flag 41 will be pivoted downwardly out of the path of the beam of eyes SI.

The cross conveyor 1 is operated by any suitable means C diagrammatically shown in Fig. 7. Automatic means for stopping the conveyor after it has moved pans a predetermined distance out of the path of conveyor 2 and thus beyond the beam of conveyor eyes CI, are provided. As shown in Fig. 1, this may comprise a plurality of spaced flexible switch operating arms 46 on the side of the conveyor 1 which intermittently contact and open a normally closed limit switch C-1 suitably positioned along side of the conveyor. The switch C-1 acts in a manner to be hereinafter described, to de-energize the cross conveyor drive C when so contacted.

Energization of the cross conveyor circuit is accomplished by means of a rotary switch C-2 which has an arm 47 that lies in the path of the wheels 9 of the carriage 8 as shown in Fig. 3. The arm 47 is operatively engaged by the wheel 9 when the carriage 8 and electromagnet bar 6 have proceeded a maximum distance from the proofer 3 and are about to reverse their direction and return to the proofer to pick up another group of pans.

The automatic control system for the unloader mechanism 5 and the conveyors 1 and 2 includes four normally closed switches each of which is opened at or for a predetermined part of the cycle of the unloader mechanism by a separate cam provided therefor. The unloader cam UC and its switch UC-1 cooperate in a manner to be described later to open the drive circuit for the magnet bar 6 and thus to stop the bar in a predetermined position, this position being the one shown in Fig. 2 wherein the bar is a minimum distance from the proofer and the magnets 7 are seeking to engage the leading edges of the pans A which are to be subsequently transferred to the cross conveyor 1. The cam UC holds the switch UC-1 open only when the bar 6 is in its terminal position adjacent the proofer exits.

The magnet cam MC and its switch MC-1 cooperate to control magnetization of the magnets 7 and, as will be described again hereinafter, cooperate to open the magnetizing circuit M, diagrammatically shown in Fig. 7, when the bars 6 have dragged the pans onto conveyor 1 and hold the magnets 7 de-energized until the bar 6 is in its terminal position adjacent the proofer exit.

The cross conveyor cam CC and its switch CC-1 cooperate with the conveyor eyes CI to shut down the entire apparatus and sound an alarm in the event that pans on the cross conveyor 1 have not cleared the conveyor 2 at that point in the cycle in which they are likely to be struck by the leading edge of bar 6 as it moves another set of pans onto the conveyor 1. For this purpose the cam CC holds the switch CC-1 open during approximately that stage of the cycle when the bar 6 travels across the apron 4 onto the conveyor 1.

The proofer cam PC and its switch PC-1 cooperate with the eyes PI to shut down the entire apparatus and sound an alarm in the event that the eyes PI are energized by pans which have advanced too far along conveyor 2 by the time the bar 6 has returned to pick them up. The cam PC preferably allows its switch PC-1 to close during all of the cycle except when the bar 6 is on the incline 15' near its terminal position at the proofer exit.

As has just been indicated, the camming surfaces of the cams UC, MC, CC and PC, are related to the cycle of the magnet bar 6. These cams are therefore preferably outer periphery cams and mounted on a common shaft 48 which is journaled in a bracket 49 mounted on frame 12. The shaft 48 has a sprocket 50 secured thereto which is driven by a chain 51 which extends about the drive sprocket 52 that is secured to the sprocket driveshaft 20. Thus it will be recognized that the cams will rotate in union with the cycle of the bar 6. The cams are shown in Fig. 6 as they would appear in a series of longitudinal spaced sections along the shaft 48 when the bar is in the terminal position adjacent the exit of proofer 3 and it will be recognized that they act in the aforementioned manner to open their respective switches at predetermined parts of the cycle.

The cam actuated switches UC-1, MC-1, CC-1 and PC-1, the cross conveyor stop and start switches C-1 and C-2, and the photo-electric cell devices PI, CI and SI, all described above, are embodied in the electric control circuit shown in Fig. 7. This circuit is energized by means of the buses or lead lines B-1 and B-2, one of which has a suitable circuit closing and opening switch PB-1 therein.

The control circuit of Fig. 6 interconnects and functionally unites four separate circuits, viz., (1) the magnet energization circuit M, (2) the unloader drive motor 23 circuit U, (3) the cross conveyor drive circuit C, and (4) the proofer conveyor drive circuit P. The magnet circuit M is direct current and therefore cannot be connected across the AC lines B-1 and B-2. However, the circuits U, C, and P are alternating current and may be connected across the lines B-1 and B-2 though they are shown as having separate lead lines.

Each of the circuits M, U, C, and P, as well as the generator included in the magnet energization circuit M, may control normally closed overload switches M-1, U-1, C-3, P-1, and G-1, respectfully, in a conventional manner. These switches are connected in series with the generator starter across the lines B-1 and B-2 in the line L-1.

The circuits P, C, U, and M are under the control, respectively, of the proofer relay PR, the cross conveyor relay CR, the unloader relay UR, and the magnet relay MR. These relays are connected in parallel to the line L-1, between the overload switches and the generator starter, and to the line L-2, the line L-2 being connected to the lead line B-2. A fifth relay R is connected in parallel with the foregoing relays but also controls the line L-2 by means of its switch R-1 which is adjacent the connection of line L-2 to bus B-2. Switch R-1 is closed when R is energized and open when it is not. The relay R also controls the operation of the alarm A, which is connected across the leads B-1 and B-2 by means of its switch R-2. Switch R-2 is open when R is energized and closed when it is not. The relay R is also connected by a by-pass line to the line B-2, this being under the control of a normally open push button type switch PB-2.

As just indicated, the relays PR, CR, UR, and MR are connected across the lines L-1 and LX2. Each of these relays has a switch which it actuates that is in series with such connection, these switches being PR-1, CR-1, UR-1, and MR-2, respectively. Each of these switches is closed when its relay is energized and open when it is not. It is desirable to complete circuits through the relays even when their respective switches are open and for this purpose by-pass circuits are provided around each of the switches.

In the circuit for proofer relay PR, the by-pass line is controlled by a normally open push button PB-3. The circuit for the proofer relay PR includes a normally closed push button PB-9 which is in series with the switch PR-1 and is capable of breaking the circuit when desired. A by-pass around the switch PR-1 is controlled by a normally open push button PB-3 so that a circuit may be completed through PR when the switch PR-1 is open.

The circuit for the cross conveyor relay CR includes the normally closed limit switch C-1 in series with the relay actuated switch CR-1. As indicated above, the switch C-1 is actuated or opened by arms 46 to break the circuit through CR-1 when the cross conveyor has moved a predetermined distance sufficient to remove pans from the line of proofer conveyor 2. Two by-passes are provided around the switches CR-1 and C-1. The first of these is controlled by the rotary limit switch C-2, which as described above, has an arm 47 that is engaged by the wheel 9 of the carriage 8 to close the circuit and thus energize the relay CR. The second by-pass is controlled by a normally open push button PB-4. When this is closed, the relay CR is energized or connected across the lines L-1 and L-2.

The circuit for the unloader relay UR includes the normally closed cam actuated limit switch UC-1, previously described, in series with the relay actuated switch UR-1. Two by-passes are provided around the switches UC-1 and UR-1. The first of these is controlled by a normally open push button PB-5 and the second by a switch T-1. When either of these switches is closed, the relay UR is connected through a by-pass to the lines L-1 and L-2.

The switch T-1 is actuated by a timer T which is connected across the lines B-1 and B-2 under the control of switch MR-1. Switch MR-1 is closed by energization of the magnet relay MR, the circuit of which will be presently described. The timer is of any suitable type which is adapted to close the switch T-1 a predetermined period after it is energized by closing the switch MR-1. These are well known to those in the art.

The circuit for the magnet relay MR includes the normally closed cam actuated limit switch MC-1 in series with the relay actuated switch MR-2 and the normally closed push button switch PB-8. A by-pass is provided around the switches MR-2 and MC-1 and this is controlled by normally open push button PB-6 which is thus in series with switch PB-8. A by-pass is provided around switch MR-2 and this is controlled by the switch PI-1. The switch PI-1 is actuated by the photoelectric eye relay device PI, which scans the proofer conveyor 2 as previously described, and closes when the beam is broken by pans A.

The photoelectric cell and relay devices CI, SI, and PI, which have been previously described, are each connected across the buses B-1 and B-2 and, if desired, safety switches (not shown) may be provided in this connections. The eyes CI, SI, and PI control the operation of the normally closed switches CI-1, SI-1, and PI-2, respectively, which are in series in line L-2 between the relay connections thereto and the switch R-1, which has been previously mentioned. When the beam provided by any of these cell units is broken, the corresponding switch is opened.

A by-pass around switch CI-1 is provided and this is controlled by the cam actuated switch CC-1 previously described. The cam actuated switch PC-1, also previously described, controls a by-pass around the switch PI-2. A normally closed push button switch PB-7 in the line L-2 between the bus B-2 and the relay connections provides a means for breaking the relay circuits and shutting down the entire apparatus.

The foregoing description shows the circuit connections of the relays PR, CR, UR, and MR. As above indicated, these relays control the separate circuits, P, C, U, and M. This is accomplished, respectively, by means of the relay actuated switch PR-2 in the proofer conveyor drive circuit P, the relay actuated switch CR-2 in the cross conveyor drive circuit C, the relay actuated switch UR-2 in the unloader drive motor 23 circuit U, and the relay actuated switch MR-3 in the magnet energization circuit (including a generator) M. The switches PR-2, CR-2, UR-2, and MR-3 are closed when their respective relays are energized and open when they are not.

In order to start up the apparatus described above by the circuit just described, the push button switches PB-1 and PB-2 are closed. This energizes the relay R which closes R-1 to connect line L-2 to bus B-2 and opens R-2 so that the alarm A is disconnected from the leads B-1 and B-2. The proofer relay PR is then energized by pressing push button PB-3. The energized relay closes its switches PR-1 and PR-2 so that it is connected to line L-2 and the proofer drive P starts up. The cross conveyor relay CR is energized by pressing push button PB-4. The relay CR then closes its switch CR-1 and its switch CR-2 so that the cross conveyor drive is actuated. The conveyor will index to the point where C-1 is opened by an arm 46 to stop movement of the conveyor and further movement will have to be actuated by the carriage wheels 9 striking the arm 47 of the switch C-2 to energize the relay CR and thus close CR-1 and CR-2 and move the conveyor a sufficient amount to allow C-1 to close again whereupon the circuit holds and the cross conveyor moves until C-1 is struck by another arm 46.

The unloader relay UR is energized by pressing push button PB-5. This closes switches UR-1 and UR-2 so that the unloader drive motor 23 can rotate the chain 15 and move the magnet bar 6. This movement acts through the sprocket 52 to rotate the cam shaft 48 and the attached cam UC. When the bar has proceeded to the terminal position nearest the proofer 3, cam UC, as indicated in Fig. 6, opens switch UC-1. This de-energizes the relay UR and opens UR-2 to stop the motor 23 and hold the bar 6 and attached magnets 7 in the position of Figs. 1 and 2.

When the bar 6 is in the halted position of Fig. 1 and Fig. 2 due to the opening of switch UC-1, as just described, the push button PB-6 may be pressed to energize relay MR. This closes MR-1 and starts the timer T. It also closes MR-2 and at this point in the cycle it will be seen from Fig. 6 that the switch MC-1 is closed, so that the relay MR remains energized. Switch MR-3 is also energized and this actuates the magnet circuit M to energize the magnets 7 which are carried by the bar 6. It will be recognized that if, at this position of cam MC, a pan A intercepts the beam of eye PI, that the same result would be accomplished as by closing switch PB-6. The cutting of the beam of PI would close PI-1 and thus permit energization of the relay MR.

With the foregoing adjustments, the circuit is set into automatic operation. When the timer T closes the switch T-1, the unloader relay UR will be energized and the drive motor 23 will start to move the bar 6 and connect pusher bar 25 toward the conveyor 1 with pans A attracted to the energized magnets 7. Under normal operating conditions, the circuit will remain in this condition until the pans A are on the conveyor 1 at which point the cam MC opens the switch MC-1. This de-energizes the magnets 7 and disconnects the pans A therefrom. At or just after this occurs, the wheel of carriage 8 strikes the arm 47 to close the switch C-2 and energize the cross conveyor relay CR and set the conveyor 1 into motion to carry away the pans A. Assuming a continuation of normal operation, the carriage 8 and bar 6 will proceed on the return portion of their cycle with the chain 15. During this period the cam MC holds the switch MC-1 open to prevent energization of the magnets 7 and the proofer conveyor moves pans A towards the cross conveyor 1. When the bar 6 starts down the incline 15', the cam PC opens switch PC-1 and when bar 6 has just about returned to its starting position as shown in Figs. 1 and 2, the cam MC allows switch MC-1 to close. At about this point the beam of eyes PI is cut by pans advancing on proofer conveyor 2. Just prior to this the cam PC allows switch PC-1 to close again so that opening of switch PI-2 does not break the circuit through line L-2. Interception of the beam of eyes PI closes switch PI-1 and since MC-1 is closed, the magnet relay MR is energized. This, in addition to energizing the magnets 7, closes MR-1 to start the timer T. At about this point the bar 6 reaches its proofermost position of Figs. 1 and 2 and the cam UC opens the switch UC-1 to stop the motor 23 and movements of the bar. These conditions hold until the timer closes switch T-1 to energize relay UR and start the motor 23 to repeat the cycle just described, the timer holding for a period of several seconds to allow the conveyor 2 to move pans close to the magnet bar 6.

In the foregoing normal operations of the apparatus, it will be noted that neither of three possible conditions occurred which would result in shutting down of the apparatus and a cessation of operation until restarted in the manner already described. The first of these conditions is a cutting of the beam of eyes PI while the cam PC holds the switch PC-1 open. The cam PC is designed to open the switch PC-1 only during a brief interval while the bar 6 is approaching the proofer 3 when there is danger of its falling on top of a pan A which has advanced too far on the conveyor 2. During the remainder of the cycle the beam of PI may be cut to open switch PI-2 and current will be by-passed through the switch PC-1 but during this interval the cutting of the beam of eye PI by a pan which has advanced too far on conveyor 2 relative to the bar 6, will disconnect the line L-2 from the bus B-2 since both switches PC-1 and PI-2 will be open. This will de-energize all of the relays and shut down the entire apparatus. In de-energizing the relay R, it will allow the normally closed switch R-2 to close and this will connect the alarm A to the buses B-1 and B-2 so that it will sound and audibly advise the operator that his attention is required. When the operator has properly positioned the pan which prematurely cut the beam of eye PI, he can restart the apparatus in the manner already described.

A second condition which results in shutting down of the entire apparatus is the raising of the flag 41, as described hereinabove, due to the pusher bar 25 falling on top of a pan A. The flag 41 then cuts the beam of eyes SI which opens the switch SI-1. This breaks the circuit through line L-2 and de-energizes all the relays with the results just indicated above.

A third condition which will shut down the apparatus occurs when the beam of eyes CI is cut by pans on the cross conveyor 1 at the same time as the cam CC opens the switch CC-1, this time being just before the bar 6 reaches the proofer edge of the conveyor 1. If the beam of eyes CI is cut, the switch CI-2 is opened. If the switch CC-1 is closed, current is by-passed therethrough. However, the cam CC opens this switch during the period when there is danger of collision between the bar 6 and pans on the conveyor 1, so that if there are pans which have not cleared the line of conveyor 2, they will, by cutting the beam of eyes CI, break the circuit to de-energize the relays and sound the alarm in the manner already indicated.

In Fig. 8 a modified form of pusher bar is illustrated which eliminates the photoelectric cell device SI. In this form the pusher bar 53 is connected directly to the transverse shaft 26 and comprises a substantially vertical, channel-shaped, transverse member having its upper flange 54 extending over the shaft 26. A plurality of upright studs 55 are affixed to the shaft 26 and extend through holes provided therefor in the flange 54 of the pusher bar. The upper ends of the studs 55 have nuts and washers 56 or other suitable abutments whereby the springs 57 on the studs may be compressed on the tops of the flange 54 to yieldably hold the bar 53 in downward position. The shaft 26 has a bracket 58 affixed thereto which carries a normally closed limit switch LS-1 and positions it above a finger 59 on the bar 53.

It is apparent from Fig. 8 considered in conjunction with Fig. 2 that if the bottom of pusher bar 53 should strike the top of pan A on its descent from the elevator track 35, the entire bar 53 will move upwardly relative to the shaft 26 against the resistance of the springs 57 to the dotted line position of Fig. 8. The finger 59 will then open the limit switch LS-1 to break the operating circuits and shut down the entire apparatus.

As shown in Fig. 9 the limit switch LS-1 replaces the switch SI-1 of Fig. 6 and thus eliminates the need for the photo-electric cells SI. In normal operation switch LS-1 will be closed, but, in the event that the pusher bar 53 is lifted by a pan A, it will open to break the circuit through line L-2 and shut down the entire apparatus and sound the alarm A in the manner described in connection with Fig. 7.

It will be apparent that modifications may be made in many of the details described herein, hence it is not intended to limit the scope of the invention to the specific embodiments illustrated.

What is claimed is:

1. In a conveyor system having a pair of conveyors providing spaced first and second moving roadways for the conveyance of articles, automatic means for transferring articles from the first roadway to the second comprising, in combination, a stationary member between the moving roadways providing a rectilinear stationary interconnecting roadway therebetween, a pair of transversely spaced rectilinear tracks spaced above the longitudinally extending edges of the stationary roadway and projecting beyond both ends of said roadway so as to lie above portions of both the first and second moving roadways, a transverse pull bar adapted to pull the conveyed articles movably mounted on said tracks and spaced slightly above the surfaces of the roadways, first automatic means for moving said bar on the tracks from a position over the first conveyor to a position over the second conveyor and for raising the bar from the tracks to a substantial distance above the second conveyor and then moving it in raised position back over the first conveyor and then lowering it onto the tracks, a transverse pusher bar spaced slightly above the roadways movably mounted on the tracks on the first conveyor side of the pull bar and spaced therefrom by a distance sufficient to receive articles between said bars, a longitudinal drag link pivotally connected at its ends to the bars to interconnect the same so that pusher bar moves on the tracks behind the pull bar during the latter's movement from the first conveyor to the second and on the tracks ahead of the pull bar during the latter's movement from the second conveyor to the first, and automatic means for raising the pusher bar a substantial distance above the first roadway as it moves ahead of the pull bar and for lowering it to a position slightly above the first roadway as it moves behind the pull bar.

2. The invention as claimed in claim 1 wherein the last automatic means comprises longitudinally adjustable elevated track sections operatively connected to the tracks and longitudinally spaced from the stationary roadway and centrally pivoted track sections normally engaging the tracks adjacent the junction of the first and stationary roadways and extending over portions of the elevated track sections whereby as the pusher bar moves ahead of the pull bar toward the first conveyor it rides up the pivoted track sections and is transferred thereby to the elevated track sections, and as the pusher bar moves behind the pull bar toward the second conveyor it rides down the elevated track sections to the tracks and beneath the pivoted track sections to pivot the same upwardly out of their normal engagement with the tracks.

3. In a conveyor system having a pair of conveyors providing spaced first and second moving roadways for the conveyance of articles, automatic means for transfering articles from the first roadway to the second comprising, in combination, a stationary member between the moving roadways providing a rectilinear stationary interconnecting roadway therebetween, a pair of transversely spaced rectilinear tracks spaced above the longitudinally extending edges of the stationary roadway and projecting beyond both ends of said roadway so as to lie above portions of both the first and second moving roadways, a transverse pull bar adapted to pull the conveyed articles movably mounted on said tracks and spaced slightly above the surfaces of the roadways, first automatic means for moving said bar on the tracks from a position over the first conveyor to a position over the second conveyor and for raising the bar from the tracks to a substantial distance above the second conveyor and then moving it in raised position back over the first conveyor and then lowering it onto the tracks, photoelectric devices on opposite sides of the first roadway adjacent to point at which said pull bar is lowered providing a photoelectric beam across the roadway, and means operable by cutting of the beam during at least the period of incipient lowering of the bar for rendering the first automatic means inoperative and thus stopping movement of the bar.

4. A conveyor system comprising a first conveyor providing a first moving roadway for articles to be conveyed, a second conveyor providing a second roadway for articles to be conveyed, means providing a stationary roadway between the first and second roadways for the transfer of articles from the first conveyor to the second conveyor, endless chain means disposed above the stationary roadway having its lower reach movable from the first conveyor to the second conveyor and its upper reach movable in the opposite direction, an electromagnet bar carried by the chain means and being disposed transversely of the stationary roadway, a track beneath the lower reach, a pusher bar movable on the track and disposed transversely of the stationary roadway, said pusher bar being spaced from the electromagnet bar on the first conveyor side thereof, linkage means movably connecting the pusher bar to the chain whereby the pusher bar remains on the track and on the first conveyor side of the electromagnet bar, and elevating means on the track for raising the pusher bar above the first roadway operative only when the pusher bar moves in the direction toward the first conveyor.

5. In a conveyor system, means for moving articles relative to a conveyor from a point thereon to a second point, comprising in combination, a pusher member adapted to push articles which are carried by the conveyor, means supporting the member for movement between the two points, said means including mechanism for raising the member above articles on the conveyor as the member moves from the second point to the point on the conveyor and then lowering it behind articles on the conveyor, means for moving the member, and pulling means operative on the foremost articles for moving the foremost articles relative to those following thereby separating those articles on the conveyor which are to be moved by the member from other articles thereon so that the member may be lowered behind said articles to be moved.

6. In a conveyor system, means for moving articles relative to a conveyor from a point on the conveyor to a second point comprising, in combination, a pull bar adapted to movingly engage articles on the conveyor whereby to pull them from one point to the second point, a pusher bar spaced from the pull bar by a distance sufficient to receive an article therebetween and adapted to movingly engage articles whereby to push them from the one point to the second point, means for positioning the pull bar in engagement with the forward edges of articles at the one point to be moved, means for positioning the pusher bar in a position of at least possible engagement behind the rear edges of articles at the one point to be moved, means for disengaging the pull bar from articles moved thereby to the second point, means for removing the pusher bar from a position behind the rear edges of articles moved to the second point, and means for reciprocating the pull bar and pusher bar in unison between the one point and the second point.

7. In a conveyor system, means for moving articles relative to a conveyor from a point on the conveyor to a second point comprising in combination, a pull bar adapted to movingly engage articles on the conveyor whereby to pull them from one point to the second point, a pusher bar spaced from the pull bar by a distance sufficient to receive an article therebetween and adapted to movingly engage articles whereby to push them from the one point to the second point, means for positioning the pull bar in engagement with the forward edges of articles at the one point to be moved, means for positioning the pusher bar in a position of at least possible engagement behind the rear edges of articles at the one point to be moved, means for disengaging the pull bar from articles moved thereby to the second point, means for removing the pusher bar from a position behind the rear edges of articles moved to the second point, means for reciprocating the pull bar and pusher bar in unison between the one point and the second point, and automatic means for stopping the bars in the event that articles at the second point are in a position to interfere with movement of the bars.

8. In a conveyor system, means for moving articles relative to a conveyor from a point on the conveyor to a second point comprising, in combination, a pull bar adapted to movingly engage articles on the conveyor whereby to pull them from one point to the second point, a pusher bar spaced from the pull bar by a distance sufficient to receive an article therebetween and adapted to movingly engage articles whereby to push them from the one point to the second point, means for positioning the pull bar in engagement with the forward edges of articles at the one point to be moved, means for positioning the pusher bar in a position of at least possible engagement behind the rear edges of articles at the one point to be moved, means for disengaging the pull bar from articles moved thereby to the second point, means for removing the pusher bar from a position behind the rear edges of articles moved to the second point, means for reciprocating the pull bar and pusher bar in unison between the one point and the second point, and automatic means for stopping the bars in the event that articles at the one point are in a position to be improperly engaged by a bar.

9. In a transfer system for moving the foremost of a train of articles supported on a surface relative to such surface, the combination of a pull member for operatively engaging the foremost articles to move the articles relative to the surface, a push member spaced from the pull member for engaging the foremost articles to push the articles relative to the surface, said members being transverse to the direction of said train of articles, means for reciprocating the members longitudinally of said train whereby on a stroke in the direction of the train the members are operative simultaneously to move the foremost articles and on the return stroke the members are positioned to operatively engage the next group of foremost articles.

10. In a transfer system for moving the foremost of a train of articles supported on a surface relative to such surface, the combination of a magnet member for operatively engaging the foremost articles to move the articles relative to the surface, a push member spaced from the pull member for engaging the foremost articles to push the articles relative to the surface, said members being transverse to the direction of said train of articles, means for reciprocating the members longitudinally of said train whereby on a stroke in the direction of the train the members are operative simultaneously to move the foremost articles and on the return stroke the members are positioned to operatively engage the next group of foremost articles.

HARRY FEIGE.

REFERENCES CITED

The following references are of record in the file of this patent:

UNITED STATES PATENTS

| Number | Name | Date |
|---|---|---|
| 1,633,014 | Harber | June 21, 1927 |
| 1,842,912 | McNamara | Jan. 12, 1932 |
| 1,875,532 | Washburne | Sept. 6, 1932 |
| 1,940,647 | Gruetter | Dec. 19, 1933 |
| 1,945,888 | Fields | Feb. 6, 1936 |
| 2,071,859 | Steiner | Feb. 23, 1937 |
| 2,371,140 | Alling et al. | Mar. 13, 1945 |
| 2,408,838 | Wilckens et al. | Oct. 8, 1946 |